United States Patent [19]

Iwai

[11] Patent Number: 5,064,342
[45] Date of Patent: Nov. 12, 1991

[54] IN-TANK TYPE MOTOR-OPERATED PUMP

[75] Inventor: Shingo Iwai, Fukuyama, Japan

[73] Assignee: Mitsubishi Denki Kabushiki Kaisha, Tokyo, Japan

[21] Appl. No.: 510,571

[22] Filed: Apr. 18, 1990

[51] Int. Cl.$^5$ .............................. F01D 1/00; F01D 5/00
[52] U.S. Cl. .................................... 415/55.1; 415/119; 417/368; 310/51
[58] Field of Search .................... 415/55.1, 55.2, 55.3, 415/55.4, 55.5, 55.6, 55.7, 90, 119; 417/368, 369; 310/51, 220, 221, 222

[56] References Cited

U.S. PATENT DOCUMENTS

| 3,668,571 | 6/1972 | Sato et al. | 310/51 |
| 3,871,797 | 3/1975 | Igarashi et al. | 415/55.1 |
| 4,429,241 | 1/1984 | Ohara et al. | 310/51 |
| 4,845,393 | 7/1989 | Burgess et al. | 310/51 |

FOREIGN PATENT DOCUMENTS

| 46-26442 | 7/1971 | Japan. | |
| 0272994 | 11/1988 | Japan | 415/119 |

Primary Examiner—John T. Kwon
Assistant Examiner—Hoang Nguyen
Attorney, Agent, or Firm—Burns, Doane, Swecker & Mathis

[57] ABSTRACT

In an in-tank type motor-operated pump, a pair of electric-noise suppressors (20) are contained in a pair of holes (22e) formed in a bracket (22) which holds brushes (4) and a rotor shaft (5), thereby incorporating the electric-noise suppressors in a body of the pump with the shortest connection wirings and without substantial increase of overall volume of the pump.

2 Claims, 4 Drawing Sheets

IN-TANK TYPE MOTOR-OPERATED PUMP

FIELD OF THE INVENTION AND RELATED ART STATEMENT

1. Field of the Invention

The present invention relates to an in-tank type motor-operated pump, which is used in a liquid fuel tank of such a vehicle as an automobile, and more particularly to a construction for supporting an electric-noise suppresser of the motor-operated pump.

2. Description of the Related Art

FIG. 4 is a cross-sectional view showing a conventional in-tank type motor-operated pump which is disclosed in e.g. Japanese examined patent publication (TOKKO) Sho 46-26442.

In the figure, a motor 1 consists mainly of a rotor 2, a commutator 3, a pair of brushes 4 and a stator 13 of a ferrite permanent magnet. An upper end part 5a of a rotor shaft 5 is held by a bracket 9 of an insulating material via a bearing 15, and a lower end part 5b of the rotor shaft 5 is held by a bracket 16 via a bearing 14. Both brackets 9 and 16 are fixed to a motor casing 8, thereby rotatably holding the rotor 2 from the motor casing 8. The staror 13 is fixedly held by the motor casing 8. Each of the brushes 4 is slidably held in the bracket 9 in the vertical direction and is urged by a spring 12 to pushingly make an electrical contact with the commutator 3. An electric power is supplied to the rotor 2 from a pair of terminals 11 via the brushes 4 with pigtails (not shown). An impeller 6, which makes pump action by its rotation, is fixed to the lower end part 5b of the rotor shaft 5 and is covered with a bottom cover 7. An inlet port 7a is formed in the bottom cover 7 and a part of the bracket 16, thereby making a blade part of the impeller 6 exposed therein. Along a part of a circumference of the impeller 6, a groove 16a is formed in the bracket 16, and also a groove 7b is formed in the bottom cover 7. These grooves 16a and 7b make an arc-shaped passage 18 therebetween in a predetermined angular range. One end of the passage 18 is opened in the inlet port 7a and the other end is communicated with an inner space 17, which is between the motor casing 8 and the rotor 2, through an associated vertical passage 16b, thereby making communication between the inlet port 7a and the inner space 17. An outlet tube 10 is formed to project upward from the bracket 9, and its inner passage 10a is communicated with an inner passage 9a formed in the bracket 9. This inner passage 9a is communicated with the inner space 17.

In the above-mentioned in-tank type motor-operated pump, the rotor 2 and the impeller 6 fixed thereto rotate by applying the voltage to the rotor 2 through the terminals 11, the brushes 4 and the commutator 3. The liquid fuel (not shown) is thereby sucked up to the inlet port 7a and is forwarded to the outlet tube 10 through the inner space 17. From the outlet tube 10, the liquid fuel is fed to an engine (not shown).

Since the commutator 3 is slidingly making contact with the bushes 4 during the rotation of the rotor 2, the power supply is intermittently executed and the brushes 4 spark, thereby causing electric noises. As a result, peripheral electric or electronic apparatuses receive undesirable noises. Therefore, an electric-noise suppresser is required to suppress the electric noises. However, since there is no room to mount the electric-noise suppresser in the pump, the electric-noise suppresser has to be provided outside around the terminals 11 or on around external cables which are arranged outside a liquid fuel tank (not shown) and are connected to the terminals 11.

In case where the electronic-noise suppresser is provided around the terminal 11, a fixing state of the electronic-noise suppresser is not tight, and an outward form of the pump must unavoidably be large. In case where the electronic-noise suppresser is provided on the externally-disposed cables out of the liquid fuel pump, there remains the electronic noises generated in the cables which lie from the electronic-noise suppresser to the motor 1.

OBJECT AND SUMMARY OF THE INVENTION

An object of the present invention is to offer an in-tank type motor-operated pump to which an electric-noise suppresser is securely attached without enlarging the configuration of the pump.

In order to achieve the above-mentioned object, the in-tank type motor-operated pump of the present invention comprises:

a casing;

a motor which is mounted in the casing to cause pump action and has a commutator;

a bracket which is fixedly mounted to the casing to rotatably hold a rotor of the motor and has a pair of through-holes and a pair of non-through-holes each having a bottom;

a pair of brushes, each of which is slidably held in each of the through-holes and makes an electrical contact with the commutator;

a pair of electric-noise suppressers, each of which is electrically connected to each of the brushes and is mounted in each of the non-through-holes; and a cover which is provided on the bracket to cover at least the through-holes and the non-through holes.

In the above-mentioned in-tank type motor-operated pump, since each of the electric-noise suppressers is mounted in each of the non-through holes and is covered with the cover, the electric-noise suppressers are completely held in the bracket. Further, since the non-through-holes are formed in the bracket, a size of the motor-operated pump is not made larger than the conventional one. Besides, it is desirable in respect of suppressing the electric noises that each of the electric-noise suppressers and each of the brushes are disposed close to each other.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, a preferred embodiment of the present invention is described with reference to the accompanying drawings.

Figure 1:
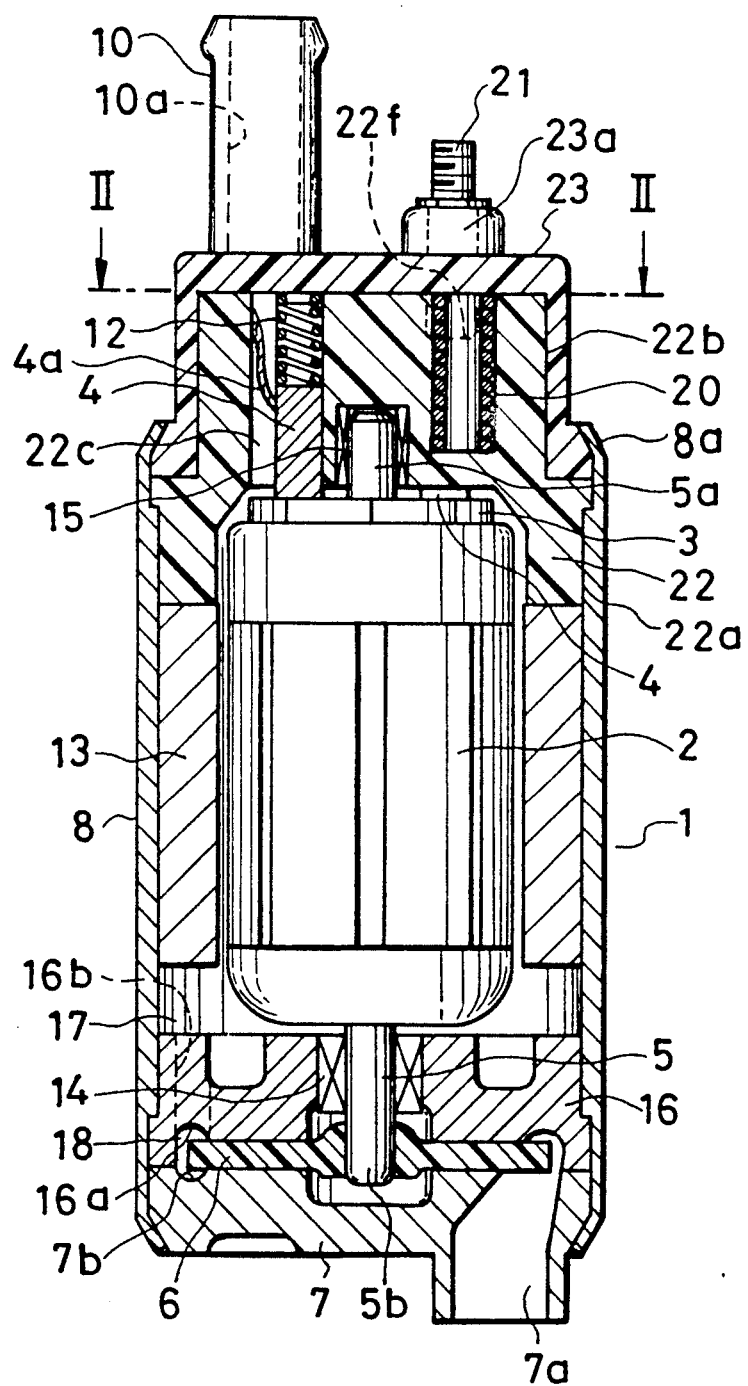
FIG. 1 is a cross-sectional view showing an in-tank type motor-operated pump of the present invention.

FIG. 1 is a cross-sectional view showing an in-tank type motor-operated pump of the present invention.

In the figure, a motor 1 consists mainly of a rotor 2, a commutator 3, a pair of brushes (only one is completely visible) 4 and a stator 13 of a ferrite permanent magnet. An upper end part 5a of a rotor shaft 5 is held by a bracket 22 of an insulating material via a bearing 15, and a lower end part 5b of the rotor shaft 5 is held by a bracket 16 via a bearing 14. Both brackets 22 and 16 are fixed to a motor casing 8, thereby rotatably holding the rotor 2 from the motor casing 8. The stator 13 is fixedly held by the motor casing 8. Each of the brushes 4 is slidably held in the bracket 22 in the vertical direction and is urged by a spring 12 to pushingly make an electrical contact with the commutator 3. An electric power is supplied to the rotor 2 from a pair of terminals 11 via the brushes 4 and their pigtails 4a. An impeller 6, which makes pump action by its rotation, is fixed to the lower end part 5b of the rotor shaft 5 and is covered with a bottom cover 7. An inlet port 7a is formed in the bottom cover 7 and a part of the bracket 16, thereby making a blade part of the impeller 6 exposed therein. Along a part of a circumference of the impeller 6, a groove 16a is formed in the bracket 16, and also a groove 7b is formed in the bottom cover 7. These grooves 16a and 7b make an arc-shaped passage 18 therebetween in a predetermined angular range. One end of the passage 18 is opened in the inlet port 7a and the other end is communicated with an inner space 17, which is between the motor casing 8 and the rotor 2, through an associated vertical passage 16b, thereby making communication between the inlet port 7a and the inner space 17. The bracket 22 is covered with a cover 23 which is made of an insulating material and has an outlet tube 10 and a pair of pipe-shaped projections 23a (only one is visible). A terminal rod 21 is tightly inserted into each of the pipe-shaped projections 23a. An upper end part of the terminal rod 21 is projected out of the pipe-shaped projections 23a so that external wires (not shown) can be connected. A lower end of the terminal rod 21 is mounted in the bracket 22 and is connected to an electrical-noise suppresser 20 which is mounted in the bracket 22, as described later.

Figure 2:
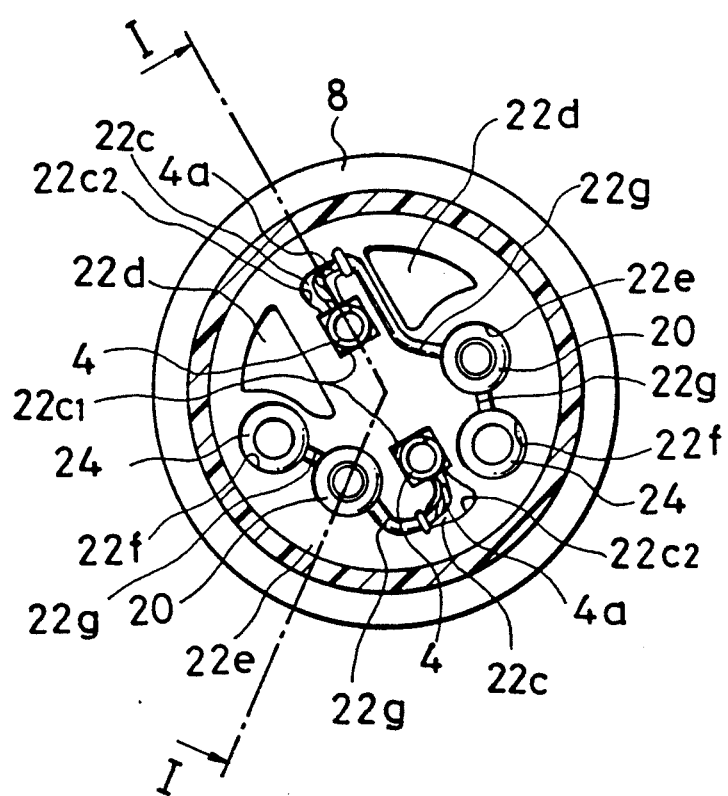
FIG. 2 is a plane view taken on line II—II in FIG. 1.
Figure 3:
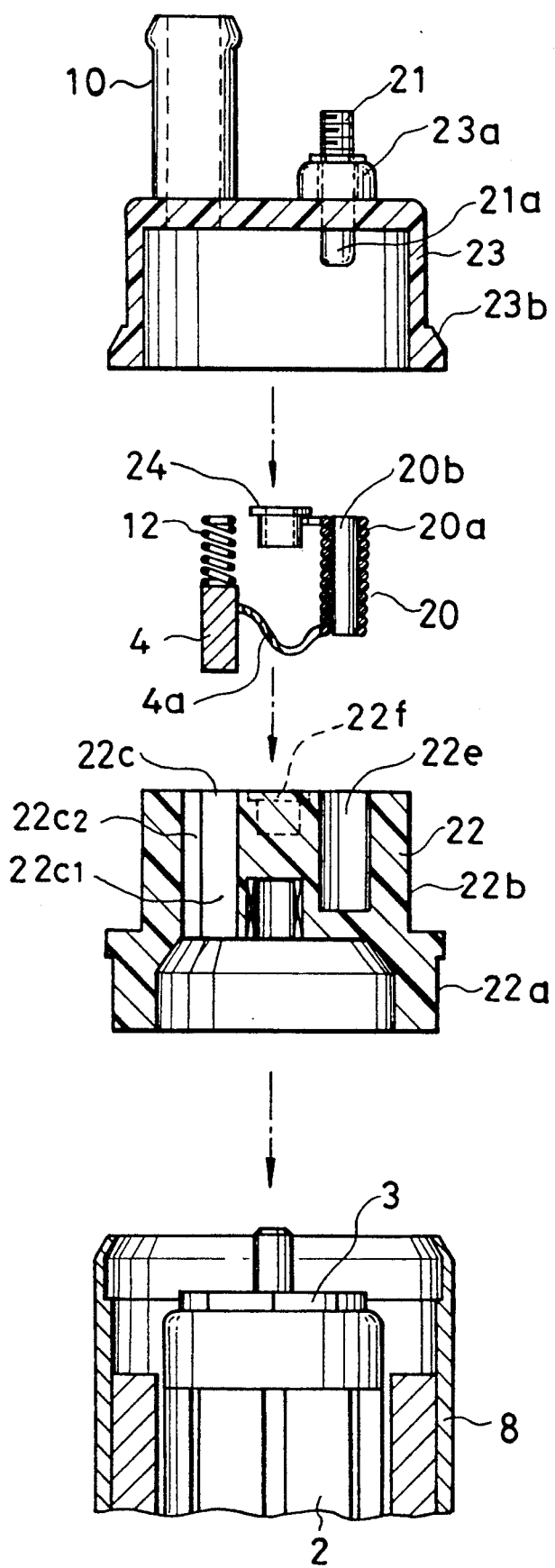
FIG. 3 is an exploded cross-sectional view showing only main parts of FIG. 1 in a state before assembly.
Figure 4:
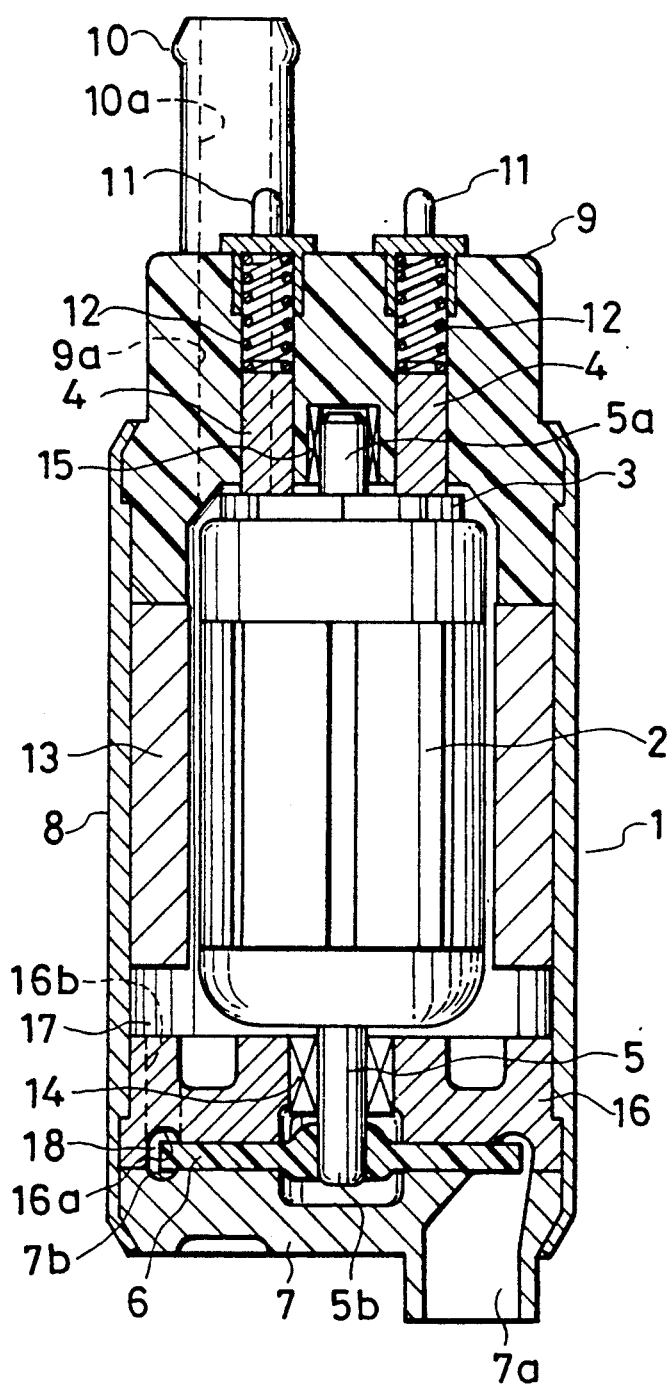
FIG. 4 is a cross-sectional view showing the conventional in-tank type motor-operated pump.

FIG. 2 is a plane view taken on line II—II in FIG. 1 (FIG. 1 is the cross-sectional view taken on line I—I in FIG. 2), and FIG. 3 is an exploded cross-sectional view showing the cover 23, the brush 4 with the electric-noise suppresser 20 etc., the bracket 22 and the motor casing 8 including the rotor 2, which are in a state before assembly. In FIG. 3, the electric-noise suppresser 20 consists of a ferrite core 20b and a coil 20a wound therearound. One end of the coil 20a is electrically connected with a junction terminal 24, and the other end of the coil 20a is electrically connected with the pigtail 4a of the brush 4. The bracket 22 has a first cylindrical part 22a and a second cylindrical part 22b as a whole. A diameter of the first cylindrical part 22a is a selected to be tightly inserted into the motor casing 8 (FIG. 1), and a diameter of the second cylindrical part 22b is selected to be tightly covered with the cover 23 (FIG. 1). In the bracket 22, a pair of first through-holes 22c and a pair of second through-holes 22d are formed as shown in FIGS. 2 and 3. Each of the first through-holes 22c is formed to have a rectangular-shaped main groove 22c1 (FIG. 3), in which the brush 4 and the spring 12 are to be held, and an auxiliary groove 22c2 (FIG. 3) which makes a recess for the pigtail 4a of the brush 4. Each of the second through-holes 22d (FIG. 2) allows fuel communication between an inner passage 10a (FIG. 1) of the outlet tube 10 and the inner space 17 (FIG. 1). Furthermore, a pair of holes 22e each having a bottom, a pair of holes 22f each having a bottom and four grooves 22g are formed in the bracket 22. Each of the electric-noise suppresser 20 is inserted into the hole 22e, and each of the junction terminals 24 is inserted in the hole 22f. Coil-lead portions of the coil 20a are mounted in the grooves 22g.

An assembling procedure shown in FIG. 3 is as follows. First, the bracket 22 is inserted and secured to the motor casing 8. Next, each of the brushes 4 with the spring 12, each of the electric-noise suppressers 20 and each of the junction terminals 24 are mounted in the through-hole 22c, the hole 22e and the hole 22f, respectively. At that time, each of the pigtails 4a and each coil-lead portion of the coil 20a are also mounted in the groove 22c2 and the grooves 22g, respectively. Next, the cover 23 is mounted on the bracket 22, thereby inserting the lower end part 21a of the terminal rod 21 into the junction terminal 24. An inner circumference of the cover 23 is tightly fit on an outer circumference of the second cylindrical part 22b. Further, as shown in FIG. 1, an upper end part 8a of the motor casing 8 is pressed to tightly hold a projected skirt part 23b (FIG. 3) of the cover 23 together with the bracket 22.

Since the electric-noise suppresser 20 is mounted in the hole 22e and is covered with the cover 23, the electric-noise suppresser 20 is held certainly in the bracket 22. Further, since the hole 22e is formed in the bracket 22, a size of the motor-operated pump is not increased in comparison with the conventional one. Besides, it is desirable in respect of suppressing the electric noises that the electric-noise suppresser 20 and the brush 4 are disposed close to each other.

In the above-mentioned in-tank type motor-operated pump, the rotor 2 and the impeller 6 fixed thereto rotate when the voltage is supplied to the rotor 2 through the terminal rods 21, the junction terminals 24, the electric-noise suppressers 20, the brushes 4 and the commutator 3. The liquid fuel (not shown) is thereby sucked up to the inlet port 7a and is forwarded to the outlet tube 10 through the inner space 17. From the outlet tube 10, the liquid fuel is fed to an engine (not shown).

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An in-tank type motor-operated pump comprising:
   a casing;
      a motor which is mounted in said casing to cause pump action and has a commutator;
      a bracket which is fixedly mounted to said casing to rotatably hold a rotor of said motor and has a pair of through-holes and a pair of non-through-holes each having a bottom;

a pair of brushes, each of which is slidably held in each of said through-holes and makes an electrical contact with said commutator;

a pair of electric-noise suppressors, each of which is electrically connected to each of said brushes and is mounted in each of said non-through holes; and a cover which is provided on said bracket to cover at least said through-holes and said non-through holes and which holds said brushes in said through-holes and said electric-noise suppressors in said non-through holes.

2. An in-tank type motor-operated pump in accordance with claim 1, wherein said bracket has a second pair of non-through-holes each having a bottom, said pump further comprising a pair of junction terminals, each of which is connected with each of said electric-noise suppressors and is mounted in each of said second pair of non-through-holes; and a pair of terminals, each of which is fixed to said cover and is arranged to be electrically connected with each of said junction terminals.

* * * * *